United States Patent
Ogino et al.

(10) Patent No.: US 10,369,586 B2
(45) Date of Patent: Aug. 6, 2019

(54) OIL JET DEVICE

(71) Applicant: Ogino Industrial Co., Ltd., Sumida-ku, Tokyo (JP)

(72) Inventors: Akira Ogino, Tokyo (JP); Shoji Mori, Tokyo (JP)

(73) Assignee: OGINO INDUSTRIAL CO., LTD., Tokyo (JP)

( * ) Notice: Subject to any disclaimer, the term of this patent is extended or adjusted under 35 U.S.C. 154(b) by 11 days.

(21) Appl. No.: 15/808,176

(22) Filed: Nov. 9, 2017

(65) Prior Publication Data
US 2018/0126405 A1    May 10, 2018

(30) Foreign Application Priority Data
Nov. 9, 2016 (JP) .................. 2016-218566

(51) Int. Cl.
| | |
|---|---|
| B05B 15/60 | (2018.01) |
| F01P 3/08 | (2006.01) |
| B05B 15/62 | (2018.01) |
| B05B 1/30 | (2006.01) |
| F01P 7/14 | (2006.01) |
| F16K 27/02 | (2006.01) |
| F01M 1/08 | (2006.01) |
| B21K 1/24 | (2006.01) |
| F01P 3/00 | (2006.01) |
| F16K 1/14 | (2006.01) |

(52) U.S. Cl.
CPC ............ *B05B 15/62* (2018.02); *B05B 1/3006* (2013.01); *F01M 1/08* (2013.01); *F01P 3/08* (2013.01); *F01P 7/14* (2013.01); *F16K 27/0245* (2013.01); *B21K 1/24* (2013.01); *F01M 2001/086* (2013.01); *F01P 2003/006* (2013.01); *F01P 2007/146* (2013.01); *F16K 1/14* (2013.01)

(58) Field of Classification Search
CPC .......... F01P 3/08; F01P 3/06; F01P 2003/006; B05B 15/62; B05B 1/302; B05B 1/3026; F01M 1/08
USPC ............ 239/569, 583, 282; 123/41.34, 41.35
See application file for complete search history.

(56) References Cited

U.S. PATENT DOCUMENTS

| | | | | |
|---|---|---|---|---|
| 2005/0072476 | A1* | 4/2005 | Neto ......................... | F01P 3/08 137/539 |
| 2012/0228538 | A1* | 9/2012 | Yoshimura ............ | B21C 23/183 251/366 |
| 2014/0238317 | A1* | 8/2014 | Gokan ...................... | F02F 3/22 123/41.17 |
| 2015/0292390 | A1* | 10/2015 | Takasaki .................. | F01M 1/08 123/41.35 |
| 2016/0290188 | A1* | 10/2016 | Gokan ..................... | F01M 1/08 |

\* cited by examiner

*Primary Examiner* — Arthur O. Hall
*Assistant Examiner* — Tuongminh N Pham
(74) *Attorney, Agent, or Firm* — Cantor Colburn LLP

(57) ABSTRACT

An oil jet device for supplying pressure oil which is supplied from a pressure oil supply source, includes a valve body and a supporting portion. The valve body is molded by cold-forging a metal material and accommodates a valve portion for controlling the supply of the pressure oil from the pressure oil supply source. The supporting portion is molded by cold-forging a metal material, supports the valve body, and has a first principal surface having a flat shape and configured to abut on an attachment target object.

2 Claims, 3 Drawing Sheets

OIL JET DEVICE

CROSS REFERENCE TO RELATED APPLICATION

The present invention claims priority under 35 U.S.C. § 119 to Japanese Patent Application No. 2016-218566 filed Nov. 9, 2016. The entire content of the priority application is incorporated herein by reference.

TECHNICAL FIELD

The present disclosure relates to an oil jet device for supplying pressure oil which is supplied from a pressure oil supply source.

BACKGROUND

In recent years, the output power and the performance of gasoline engines and diesel engines have been increased, and it has been important to cool heat that is generated in a piston of an engine.

Hence, an oil jet device is used for cooling the back side of the piston, for example. The oil jet device cools the piston by supplying pressurized oil (pressure oil)

The oil jet device includes a main body, a valve portion, and a nozzle for supplying pressure oil to the back side of a piston. The main body includes a valve body for introducing pressure oil from a pressure oil supply source and an attachment portion for attaching the oil jet device to an engine block. The valve portion is disposed in the valve body so as to control the supply of the pressure oil to the outside, and a nozzle The main body including the valve body and the attachment portion are integrally molded by powder metallurgy. A portion of the valve body projects from the attachment portion, the projection portion is inserted into the engine block to receive oil from the pressure oil supply source.

SUMMARY

An oil jet device for supplying pressure oil which is supplied from a pressure oil supply source, in accordance with one or more embodiments includes a valve body and a supporting portion. The valve body is molded by cold-forging a metal material and accommodates a valve portion for controlling the supply of the pressure oil from the pressure oil supply source. The supporting portion is molded by cold-forging a metal material, supports the valve body, and has a first principal surface having a flat shape and configured to abut on an attachment target object.

DETAILED DESCRIPTION

An oil jet device according to one embodiment of some embodiments will be described with reference to the drawings. The oil jet device of the present embodiment is an oil jet device for supplying pressure oil, which is supplied from a pressure oil supply source, to the outside.

Figure 1:
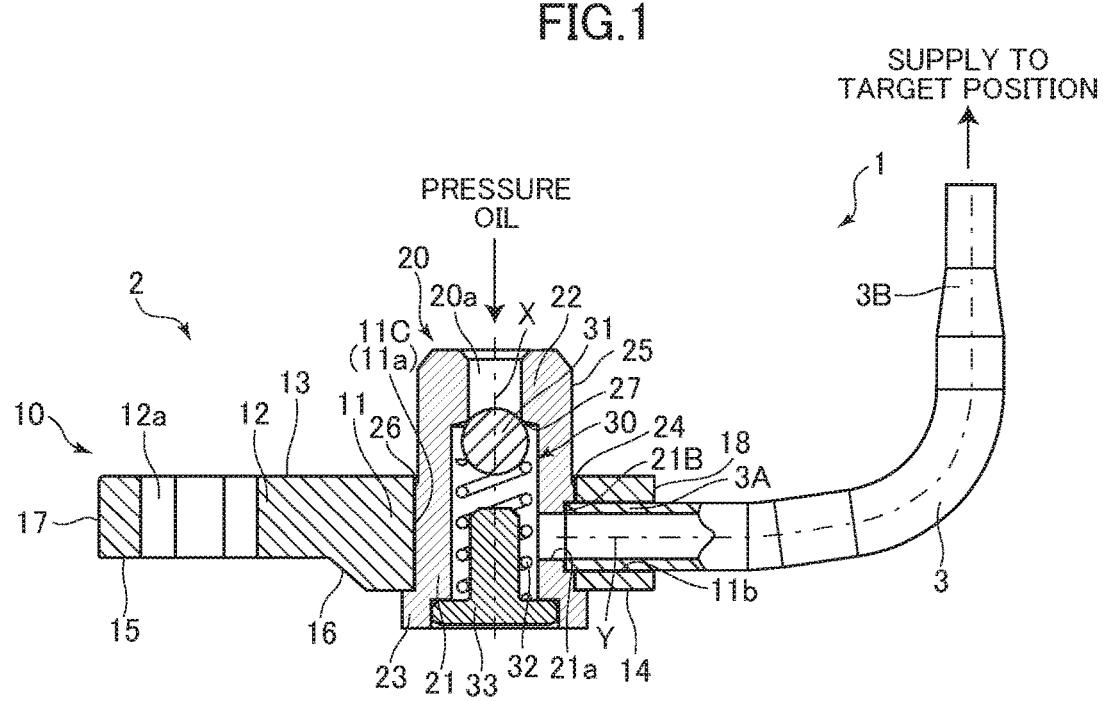
FIG. 1 is a partial cross-sectional view of an oil jet device according to one embodiment.
Figure 2:
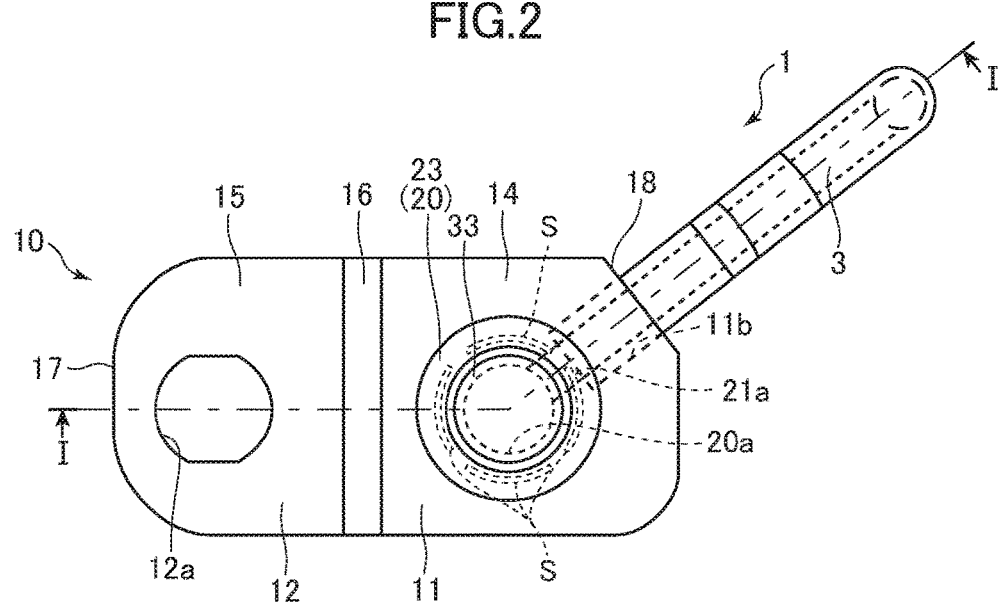
FIG. 2 is a plan view of the oil jet device when seen from a side opposite to the side where pressure oil is supplied.

FIG. 1 is a partial cross-sectional view of an oil jet device 1 according to the embodiment. FIG. 2 illustrates a plan view of the oil jet device 1 when seen from a side opposite to the side where pressure oil is supplied. The partial cross-sectional view of the oil jet device 1 shown in FIG. 1 is taken along line I-I in FIG. 2.

The oil jet device 1 includes a main body 2 and a nozzle 3.

The main body 2 includes a supporting portion 10, a valve body 20, and a valve portion 30.

The supporting portion 10 is molded by cold-forging a planar steel (for example, a carbon steel) in multistage (multistage type horizontal forging) and has an approximately rectangular shape in a plan view. The supporting portion 10 includes a valve body supporting portion 11 and a bolt insertion portion 12. The valve body supporting portion 11 and the bolt insertion portion 12 are formed by a first principal surface 13, a second principal surface 14, a third principal surface 15, an inclined surface 16, and a side surface 17. The first principal surface 13, the second principal surface 14, and the third principal surface 15 have a flat shape and are parallel to one another. The second principal surface 14, the third principal surface 15, and the inclined surface 16 are positioned on the opposite side to the first principal surface 13 in a thickness direction of the supporting portion 10, and the inclined surface 16 connects the second principal surface 14 and the third principal surface 15. The side surface 17 is connected orthogonally to the first principal surface 13, the second principal surface 14, and the third principal surface 15. The first principal surface 13 abuts on an engine block 5, which is an attachment target object, as will be described later.

The first principal surface 13 is a surface common to the valve body supporting portion 11 and the bolt insertion portion 12. The second principal surface 14 configures the valve body supporting portion 11. The third principal surface 15 configures the bolt insertion portion 12. The bolt insertion portion 12 is thinner than the valve body supporting portion 11. Moreover, a notch surface 18 is formed on a corner of the valve body supporting portion 11, which is a portion of the side surface 17. The notch surface 18 is formed during cold-forging.

A valve body insertion hole 11a in which the valve body 20 is inserted and a nozzle insertion hole 11b for insertion of the nozzle 3 are formed in the valve body supporting portion 11, and a bolt insertion hole 12a in which a bolt 4 (FIG. 3F) is inserted for attachment to the engine block 5 (FIG. 3F) is formed in the bolt insertion portion 12. The valve body insertion hole 11a extends in the thickness direction of the valve body supporting portion 11 and penetrates through the valve body supporting portion 11 and is open to the first principal surface 13 and the second principal surface 14. The bolt insertion hole 12a extends in the thickness direction of the bolt insertion portion 12 and penetrates through the bolt insertion portion 12 and is open to the first principal surface 13 and the third principal surface 15. The nozzle insertion hole 11b has one end open to the notch surface 18 and the other end open to the valve body insertion hole 11a. The valve body insertion hole 11a and the nozzle insertion hole 11b are orthogonal to each other.

The bolt insertion hole 12a is formed during cold-forging. That is, the bolt insertion portion 12 is formed in such a thickness that the bolt insertion hole 12a can be formed by cold-forging. Moreover, the valve body insertion hole 11a and the nozzle insertion hole 11b are formed by mechanical processing (milling or the like) after cold-forging. The valve body supporting portion 11 is thicker than the bolt insertion portion 12 since it is necessary to form the nozzle insertion hole 11b for insertion of the nozzle 3.

The valve body 20 is molded by cold-forging a cylindrical steel (for example, a carbon steel) in multistage (multistage type horizontal forging) and has an approximately cylindrical shape. A through-hole 20a is formed in the valve body 20 so as to penetrates therethrough along an axis X thereof. The through-hole 20a includes three holes having different diameters which decrease as it advances from the second principal surface 14 side along the axis X.

Moreover, the valve body 20 has a supported portion 21 and a projection portion 22, and the supported portion 21 is press-fitted to the valve body insertion hole 11a of the valve body supporting portion 11 whereby the valve body 20 is supported by the valve body supporting portion 11. The valve body 20 is supported by the valve body supporting portion 11 in a state in which the axis X thereof is parallel to the thickness direction of the valve body supporting portion 11. A discharge hole 21a that communicates with the through-hole 20a and the nozzle insertion hole 11b is formed in the supported portion 21 (see also FIG. 3C). A step 21B is formed in the supported portion 21 so that the diameter of the discharge hole 21a at a side close to the through-hole 20a is smaller than the diameter of the discharge hole 21a at a side close to the nozzle insertion hole 11b due to the step 21B. Moreover, the diameter of the discharge hole 21a at a side close to the nozzle insertion hole 11b is approximately the same as the diameter of the nozzle insertion hole 11b.

A flange portion 23 is provided at an end of the supported portion 21 on the opposite side to the projection portion 22 so as to project toward the outer side (the direction orthogonal to the axis X (the thickness direction)). The flange portion 23 is in contact with the second principal surface 14 to prevent the valve body 20 from slipping out toward the first principal surface 13.

A step 24 that is tapered form is formed around the whole circumference at a boundary portion between an outer-circumference portion of the supported portion 21 and an outer-circumference portion of the projection portion 22. Due to the step 24, the diameter of the projection portion 22 is slightly smaller than that of the supported portion 21. The step 24 is positioned on the second principal surface 14 side with respect to the first principal surface 13. Therefore, an outer circumferential surface 25 of the projection portion 22 is not in contact with an inner circumferential surface 11C that defines the valve body insertion hole 11a, and a gap 26 is formed between the outer circumferential surface 25 of the projection portion 22 and the inner circumferential surface 11C of the valve body insertion hole 11a. A greater part of the projection portion 22 protrudes from the first principal surface 13 along the axis X. The pressure oil supplied from a pressure oil supply source (not shown) is introduced from a distal end of the projection portion 22 into the valve body 20. The outer circumferential surface 25 of the projection portion 22 is at a right angle to the first principal surface 13.

The valve portion 30 has a ball 31 which is a valve element, a spring 32, and a pedestal 33 and is accommodated in the through-hole 20a of the valve body 20. The pedestal 33 has a stepped columnar shape having a convex cross-section. The pedestal 33 is inserted into the through-hole 20a from the flange portion 23 and is fixed to the supported portion 21 by swage-punching the supported portion 21 that surrounds the pedestal 33. The spring 32 is supported by a projection of the pedestal 33 and urges the ball 31. The spring 32 always urges the ball 31 toward a valve seat 27 formed on an inner circumferential surface of the projection portion 22.

According to such a configuration, when the pressure of the pressure oil supplied from the pressure oil supply source (not shown) is equal to or lower than a predetermined pressure, the ball 31 remains in contact with the valve seat 27 (a valve closing state) by the urging force of the spring 32, whereas when the pressure of the pressure oil exceeds the predetermined pressure, the ball 31 is separated from the valve seat 27 against the urging force (a valve open state).

The nozzle 3 has a base end portion 3A and a jetting portion 3B and the base end portion 3A is inserted into the nozzle insertion hole 11b and a portion of the discharge hole 21a close to the nozzle insertion hole 11b and is fixed to the valve body supporting portion 11 by soldering a zinc alloy solder or the like. In this way, the nozzle insertion hole 11b and the portion of the discharge hole 21a close to the nozzle insertion hole 11b function as a nozzle insertion hole. The zinc alloy solder is evenly spread on a contact surface between the valve body supporting portion 11 and the supported portion 21 of the valve body 20 as well as a contact surface between the base end portion 3A of the nozzle 3 and the valve body supporting portion 11. The pressure oil is jetted from the jetting portion 3B toward the outside. For example, when the oil jet device 1 is attached to the engine block 5, the pressure oil is jetted from the jetting portion 3B to a cooling channel inlet on the back side of the piston. Moreover, as shown in FIGS. 1 and 2, the nozzle 3 is connected to the valve body supporting portion 11 so that an axis Y of the nozzle 3 is orthogonal to and crosses the axis X of the valve body 20.

Next, a method of manufacturing (assembling) the oil jet device 1 will be described with reference to FIGS. 3A to 3F.

Figure 3A:
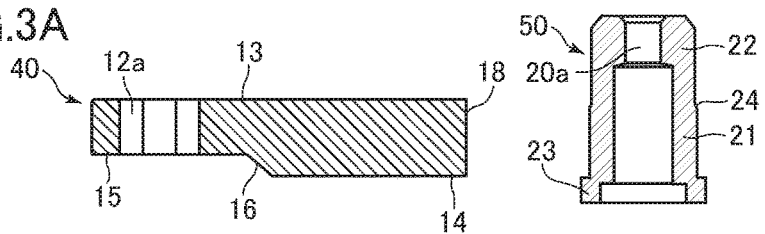
FIGS. 3A-3F are explanation diagrams of a method of manufacturing (assembling) the oil jet device.

First, as shown in FIG. 3A, a first supporting-portion-base material 40 which is a forged part manufactured by cold-forging a planar steel or the like in multistage, and a valve-body-base material 50 which is a forged part manufactured by cold-forging a cylindrical steel or the like in multistage are prepared. The first supporting-portion-base material 40 has a configuration similar to the supporting portion 10 except that the valve body insertion hole 11a and the nozzle insertion hole 11b are not formed, and the valve-body-base material 50 has a configuration similar to the valve body 20 except that the discharge hole 21a is not formed.

Figure 3B:
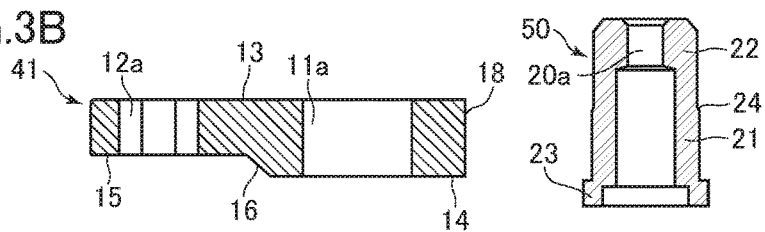

Subsequently, as shown in FIG. 3B, the valve body insertion hole 11a is formed in the first supporting-portion-base material 40 by milling to manufacture a second supporting-portion-base material 41.

Figure 3C:
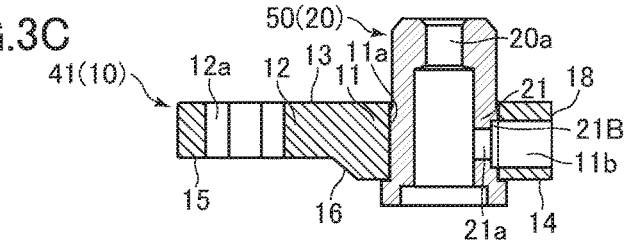

Subsequently, as shown in FIG. 3C, the supported portion 21 of the valve-body-base material 50 is press-fitted from the second principal surface 14 into the valve body insertion hole 11a of the second supporting-portion-base material 41. The nozzle insertion hole 11b and the discharge hole 21a are formed in the second supporting-portion-base material 41 and the supported portion 21 by milling, respectively. The discharge hole 21a is formed so that the step 21B is formed in the supported portion 21.

When the nozzle insertion hole 11b is formed in the second supporting-portion-base material 41, the supporting-portion-base material 40 becomes the supporting portion 10. When the discharge hole 21a is formed in the valve-body-base material 50, the valve-body-base material 50 becomes the valve body 20.

Figure 3D:
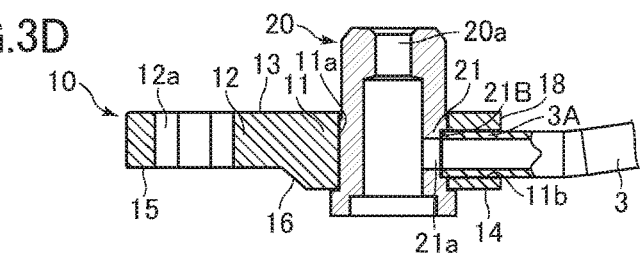

Subsequently, as shown in FIG. 3D, the base end portion 3A of the nozzle 3 is inserted into the nozzle insertion hole 11b of the valve body supporting portion 11 and the discharge hole 21a of the valve body 20 and is soldered by a zinc alloy solder whereby the nozzle 3 is fixed to the valve body supporting portion 11. As described above, the zinc alloy solder is evenly spread on the contact surface between the valve body supporting portion 11 and the supported portion 21 of the valve body 20 as well as the contact surface between the valve body supporting portion 11 and the base end portion 3A of the nozzle 3.

Figure 3E:
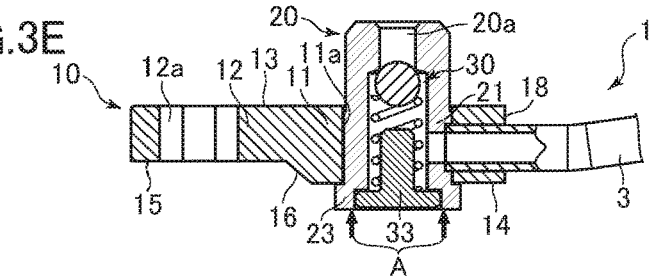

Subsequently, as shown in FIG. 3E, the valve portion 30 is inserted into the through-hole 20a of the valve body 20, swage-punching is performed on an end surface of the flange portion 23 of the supported portion 21 surrounding the pedestal 33 as indicated by arrow A, and the valve portion 30 is fixed to the valve body 20. The swage-punching is performed on four regions S shifted by 90° in the circumferential direction, of the end surface of the flange portion 23 as indicated by dot lines in FIG. 2 (only two regions are illustrated in FIG. 3E).

In this way, the oil jet device 1 is manufactured.

Figure 3F:
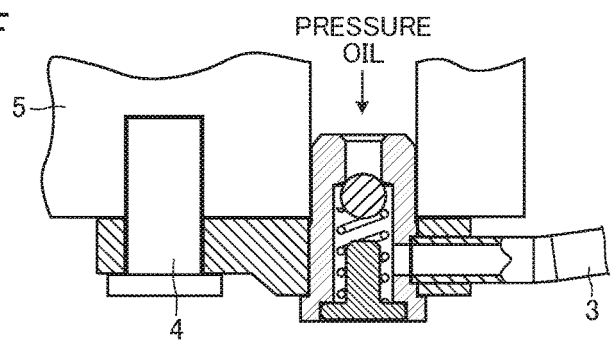

As shown in FIG. 3F, the bolt 4 is inserted into the bolt insertion hole 12a of the supporting portion 10 whereby the oil jet device 1 is attached to the engine block 5.

As described above, since the supporting portion 10 and the valve body 20 of the oil jet device 1 are forged parts molded by cold-forging steel or the like, it is possible to provide the oil jet device 1 which does not use metal powder as a material for forming the oil jet device 1. Hence, since metal powder, which is a relatively expensive material, is not used, it is possible to provide an inexpensive oil jet device 1. Moreover, since the first principal surface 13 is formed by cold-forging, it is possible to form the first principal surface 13 having satisfactory flatness and to create close-contact between the oil jet device 1 and the engine block 5 to prevent oil leakage. Moreover, by forming the notch surface 18 in the supporting portion 10, it is possible to insert a pipe obliquely.

Moreover, the bolt insertion portion 12 is thinner than the valve body supporting portion 11 and the bolt insertion hole 12a for insertion of the bolt 4 is formed in the bolt insertion portion 12 by cold-forging. Hence, since the bolt insertion hole 12a for insertion of the bolt 4 is formed by cold-forging, it is possible to easily mold the supporting portion 10 and to manufacture the supporting portion 10 at a low cost. Moreover, since the bolt insertion portion 12 is thinner than the valve body supporting portion 11, it is possible to reduce the material cost.

The projection portion 22 has a smaller diameter than the supported portion 21, and the gap 26 is formed between the outer circumferential surface 25 of the projection portion 22 and the inner circumferential surface 11C that forms the valve body insertion hole 11a. Due to this, it is possible to prevent interference with the edge of the engine block 5 and to attach the oil jet device 1 in close-contact with the engine block 5 to prevent oil leakage without providing an O-ring. Moreover, it is not necessary to strictly control the outer diameter of the supported portion 21 of the valve body 20.

The supported portion 21 includes the flange portion 23 that projects in the direction orthogonal to the thickness direction of the valve body supporting portion 11 and is in contact with the second principal surface 14. Therefore, it is possible to prevent the valve body 20 from slipping out of the supporting portion 10 to the first principal surface 13 side. Moreover, by inserting the base end portion 3A of the nozzle 3 into the step 21B of the supported portion 21 of the valve body 20, it is possible to prevent the valve body 20 from slipping out of the supporting portion 10 to the second principal surface 14 side.

Moreover, the supporting portion 10 and the valve body 20 are molded by cold-forging a carbon steel. Since the material cost for the carbon steel is inexpensive, it is possible to manufacture the supporting portion 10 and the valve body 20 at a low cost and to provide an inexpensive oil jet device 1.

Next, an oil jet device 101 according to another embodiment of the present disclosure will be described with reference to FIGS. 4 and 5.

Figure 4:
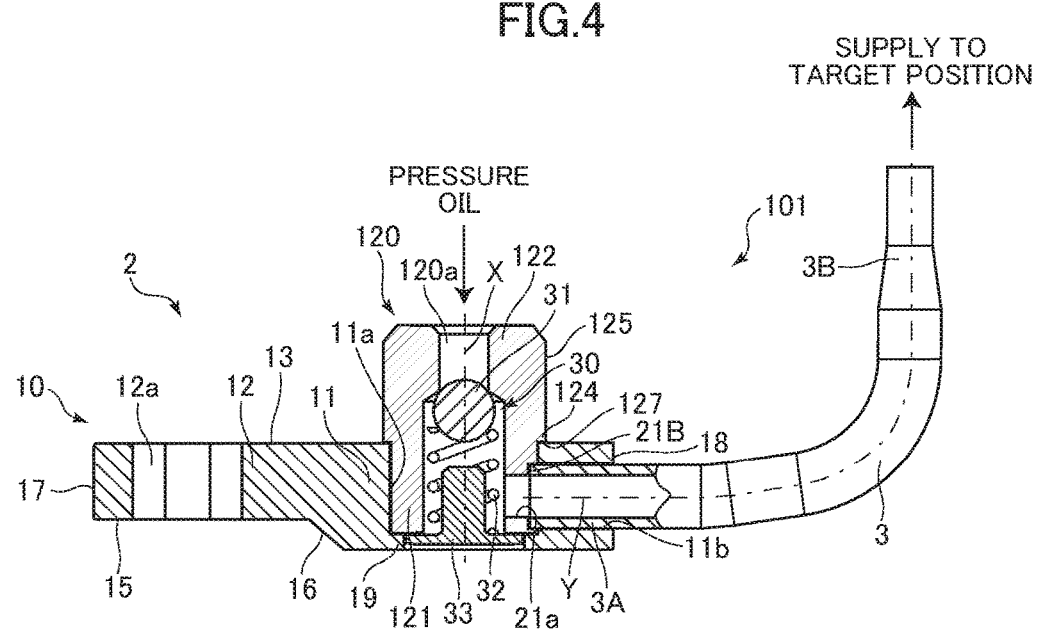
FIG. 4 is a partial cross-sectional view of an oil jet device according to another embodiment.
Figure 5:
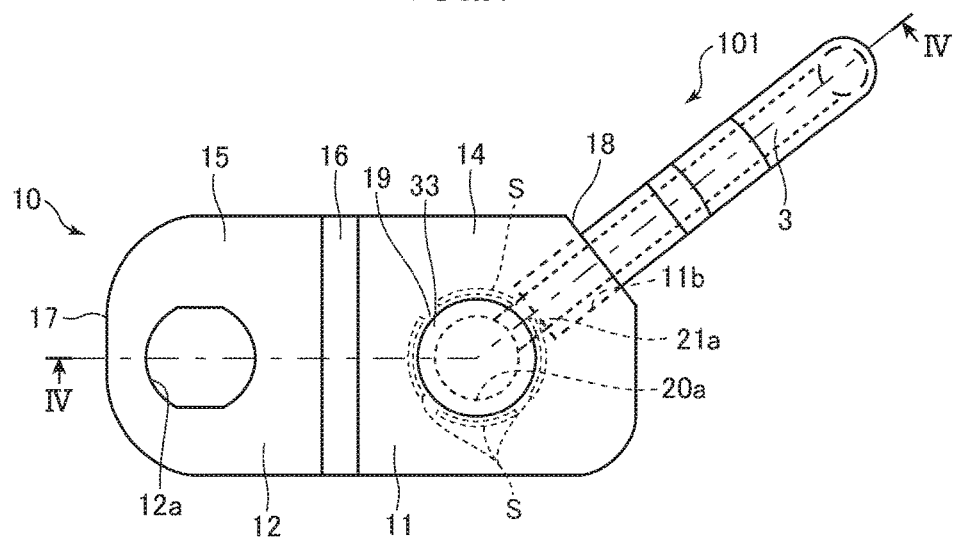
FIG. 5 is a plan view of the oil jet device when seen from a side opposite to the side where pressure oil is supplied.

FIG. 4 is a partial cross-sectional view of the oil jet device 101 according to another embodiment. FIG. 5 is a plan view of the oil jet device when seen from a side opposite to the side where pressure oil is supplied. The partial cross-sectional view of the oil jet device 101 shown in FIG. 4 is taken along line IV-IV in FIG. 5.

As shown in FIG. 4, an annular projection portion 19 that projects in a radially inward is provided on the valve body insertion hole 11a at a side close to the second principal surface 14.

A valve body 120 is molded by cold-forging (forming) a cylindrical steel or the like (for example, a carbon steel) in multistage and has an approximately cylindrical shape. A through-hole 120a is formed in the valve body 120 so as to penetrates therethrough along the axis X thereof. The through-hole 120a includes two holes having different diameters which decrease as it advances from the second principal surface 14 along the axis X.

The valve body 120 has a supported portion 121 and a projection portion 122, and the supported portion 121 is press-fitted to the valve body insertion hole 11a of the valve body supporting portion 11 whereby the valve body 120 is supported by the valve body supporting portion 11. The supported portion 121 is configured such that the supported portion 121 does not penetrate through the valve body supporting portion 11 and an end close to the second principal surface 14 is in contact with the projection portion 19. The length along the axis X of the supported portion 121 is shorter than the thickness of the valve body supporting portion 11.

The diameter of the projection portion 122 is larger than the diameter of the supported portion 121. Due to this, a step 124 is formed, and a step surface 127 of the step 124 is orthogonal to the axis X and is in contact with the first principal surface 13. Moreover, an outer circumferential surface 125 of the projection portion 122 is at a right angle to the first principal surface 13. Due to this configuration, the supported portion 121 of the valve body 120 is press-fitted into the valve body insertion hole 11a from the first principal surface 13, and the valve body 120 is supported by the valve body supporting portion 11.

The pedestal 33 of the valve portion 30 is fixed to the valve body supporting portion 11 by swage-punching the valve body supporting portion 11 surrounding the pedestal 33.

According to the oil jet device 101 described above, the length in the thickness direction (in the axis X) of the supported portion 121 press-fitted into the valve body insertion hole 11a is shorter than the thickness of the valve body supporting portion 11. According to this configuration, since the supported portion 121 is shorter than the valve body supporting portion 11, it is possible to further reduce the material cost of the valve body 120.

Moreover, the diameter of the projection portion 122 is larger than the diameter of the supported portion 121. Due to this, the step 124 is formed, and the step surface 127 of the step 124 is orthogonal to the axis X and makes contact with the first principal surface 13. Due to this, it is possible to excellent verticality of the angle between the first principal surface 13 of the valve body supporting portion 11 and the outer circumferential surface 125 of the projection portion 122 of the valve body 120. Therefore, it is possible to attach the oil jet device 101 in a close-contact with the engine block 5 and to prevent oil leakage.

While the present disclosure has been described with reference to the embodiments, the present disclosure is not limited to the above-described embodiments but can be applied to various other embodiments.

For example, although the material of the supporting portion 10 and the valve body 20 which are forged parts is a carbon steel, the material is not limited to this but may be aluminum, copper, or stainless steel. Moreover, although the soldering material is a zinc alloy, the soldering material is not limited to this but may be other metal solders such as aluminum, brass, silver, or copper.

Moreover, although the nozzle insertion hole is formed in the direction orthogonal to the axis X, the nozzle insertion hole may not necessary be orthogonal to the axis X but may cross the axis X.

Furthermore, although an oil jet device which uses the ball 31 as the valve element has been described as an example in the above embodiments, the present disclosure is not limited to this but can be also applied to an oil jet device which uses a plunger as the valve element, for example.

Furthermore, although an oil jet device which is attached to the engine block by the bolt has been described as an example in the above embodiments, the present disclosure is not limited to this but can be also applied to an oil jet device in which the valve body itself has the shape of a bolt.

What is claimed is:

1. An oil jet device for supplying pressure oil which is supplied from a pressure oil supply source, the oil jet device comprising:

a valve body that is molded by cold-forging a metal material and accommodates a valve portion for controlling the supply of the pressure oil from the pressure oil supply source; and a supporting portion that is molded by cold-forging a metal material, supports the valve body, and has a first principal surface having a flat shape and configured to abut on an attachment target object, wherein the supporting portion has a planar shape, and includes a valve body supporting portion that supports the valve body and a bolt insertion portion in which a bolt is insertable, the supporting portion having a thickness in a thickness direction orthogonal to the first principal surface; and the bolt insertion portion has a smaller thickness than the valve body supporting portion in the thickness direction, and a bolt insertion hole for insertion of the bolt is formed in the bolt insertion portion by cold-forging and penetrates through the bolt insertion portion in the thickness direction to open to the first principal surface, wherein the valve body supporting portion is formed with a valve body insertion hole in the thickness direction of the valve body supporting portion, the valve body has a cylindrical shape, and has a supported portion that is press-fitted to the valve body insertion hole, and a projection portion connected to the supported portion to project toward a side where the pressure oil is supplied, from the first principal surface, the supported portion has a smaller length in the thickness direction than the valve body supporting portion, and the projection portion has a larger diameter than the supported portion, the supported portion and the projection portion define a step having a step surface, and the step surface is orthogonal to the thickness direction and is in contact with the first principal surface.

2. The oil jet device according to claim 1, wherein the supporting portion and the valve body are molded by cold-forging a carbon steel.

* * * * *